United States Patent

Byeon et al.

[11] Patent Number: 6,104,893
[45] Date of Patent: Aug. 15, 2000

[54] IMAGE FORMING DEVICE AND METHOD HAVING OPTIMUM PRINT QUALITY BY CONTROL OF FIXTURE TEMPERATURE AND/OR TRANSFER VOLTAGE

[75] Inventors: Sang-hyeon Byeon; Nam-ryoung Kim; Seung-deok An; Kyu-cheol Shin, all of Kyonggi-do, Rep. of Korea

[73] Assignee: SamSung Electronics Co., Ltd., Suwon, Rep. of Korea

[21] Appl. No.: 09/121,156

[22] Filed: Jul. 23, 1998

[30] Foreign Application Priority Data

Jul. 23, 1997 [KR] Rep. of Korea ............... 97-34388

[51] Int. Cl.[7] .................................................. G03G 15/16
[52] U.S. Cl. ................................................. 399/66; 399/67
[58] Field of Search ........................... 399/46, 66, 67, 399/69, 297, 320; 219/216; 347/156, 102

[56] References Cited

U.S. PATENT DOCUMENTS 5,049,906  9/1991  Kobayashi et al. ............... 399/67 X
5,296,904  3/1994  Jackson ............................ 399/328
5,303,015  4/1994  Sato ................................... 399/69
5,638,098  6/1997  Iwata et al. .................. 347/102 X
5,745,658  4/1998  Gerety ............................. 395/102

FOREIGN PATENT DOCUMENTS

59-123857   7/1984   Japan .
59-152471   8/1984   Japan .
61-267074  11/1986   Japan .
5-333728   12/1993   Japan .
4-335383   11/1994   Japan .
8-83015     3/1996   Japan .
9-244424    9/1997   Japan .

Primary Examiner—Quana Grainger
Attorney, Agent, or Firm—Robert E. Bushnell, Esq.

[57] ABSTRACT

An image forming device forms an image on a recordable medium with image data supplied from a document. The device provides an otpimum print quality by varying a fixing temperature of a fixing unit after presuming an amount of consumed toner. In another embodiment, the image forming device is capable of supplying an optimum print quality by varying a transferring voltage level of a transfer unit after presuming the amount of consumed toner.

9 Claims, 7 Drawing Sheets

| Presumed amount of consuming toner | Fixing temperature(°C) |
|---|---|
| A | a |
| B | b |
| C | c |

| Presumed amount of consuming toner | Transferring voltage(V) |
|---|---|
| A | a |
| B | b |
| C | c |

FIG. 8

IMAGE FORMING DEVICE AND METHOD HAVING OPTIMUM PRINT QUALITY BY CONTROL OF FIXTURE TEMPERATURE AND/OR TRANSFER VOLTAGE

CLAIM OF PRIORITY

This application makes reference to, incorporates the same herein, and claims all benefits accruing under 35 U.S.C. § 119 from an application Entitled Image Forming Device earlier filed in the Korean Industrial Property Office on Jul. 23, 1997, and there duly assigned Serial No. 97-34388 by that Office.

BACKGROUND OF THE INVENTION

1. Technical Field

The present invention relates to an image forming device and method, more particularly, to an image forming device such as a laser printer for forming an image on a recordable medium with image data supplied from a document. The device provides an optimum print quality by varying the fixing temperature of a fixing unit after presuming an amount of consumed toner.

Moreover, the present invention relates to an image forming device and method capable of supplying otpimum print quality by varying the transferring voltage level of a transfer unit after presuming the amount of consumed toner.

2. Related Art

In an electrophotographic image forming device, such as a copier, a color copier, a color printer, an optical density device, etc., a charging roller rotates and evenly charges a photosensitive body which is spread over the outer periphery of a photosensitive drum provided with a high voltage.

The charged photosensitive body forms an electrostatic latent image by means of a laser beam transmitted from an exposing unit (i.e., a light source of a laser diode) which converts a digital signal into the laser beam.

At this time, the electrostatic latent image formed at the photosensitive drum is developed by toner passing through a developer and changed to a visible image. This visible image is transferred onto the recordable medium, which is transported and fed by a pickup roller, and thereby an image is formed. The image transferred onto the recordable medium is fixed onto the recordable medium by heat and pressure of a fixing unit and then outputted.

When power is supplied to the image forming device, a warm-up is performed with predetermined timing according to the characteristic of the device. After completing the warm-up, an on line mode capable of performing a print command is set. When the print command is not received in the on line mode during a preset time, the device is returned to a standby mode. When the print command is received in the standby mode, the printing operation is performed after passing through the warm-up phase.

The image forming device is designed to control the fixing temperature according to the kind of recordable medium and not the transferred toner amount.

Moreover, since the transferring voltage level is properly set, a proper amount of toner is transferred onto the recordable medium without regard to the amount of transferred toner.

The aforesaid image forming device has the following problems.

First, in fixing the toner transferred onto the recordable medium, the fixing temperature of the fixing unit is not controlled by the toner amount transferred onto the recordable medium. Instead, the fixing temperature varies according to the kind of recordable medium, such as normal paper or transparent paper. When a large amount of toner is transferred onto the recordable medium, an offset of the fixing temperature relative to the amount of consumed toner is generated in the fixing unit, thereby degrading the print quality.

Second, in transferring the toner onto the recordable medium, since the electric potential of the transferring voltage is predetermined, when a large amount of toner is transferred onto the recordable medium, the poor transfer of toner is generated, and thereby the print quality is degraded.

SUMMARY OF THE INVENTION

Therefore, it is an object of the present invention to provide an image forming device and method capable of maintaining an optimum print state by presumed an amount of consuming toner transferred onto a recordable medium, and varying the fixing temperature of a fixing unit according to the presumed amount of consumed toner.

It is another object of the present invention to provide an image forming device and method capable of maintaining an optimum print state by presuming an amount of consumed toner transferred onto a recordable medium, and varying a transferring voltage level according to the presumed amount of consumed toner.

According to one aspect of the present invention, the image forming device includes: an image processing unit for converting print information, which is coded and supplied from a document, into image data and presuming an amount of consumed toner by operating on the size of the converted image data; and an image forming unit for storing fixing temperature values corresponding to respective amounts of consumed toner in the form of a table, and controlling the fixing temperature of the fixing unit by detecting a fixing temperature value corresponding to the amount of consumed toner presumed by the image processing unit.

Preferably, the image processing unit includes: an image processor for converting the inputted print information into image data; and an operator for presuming the amount of consumed toner by operating on the size of the image data converted by the image processor.

At this time, the operator presumes the amount of consumed toner corresponding to a frame by operating on the size of image data corresponding to the amount of one frame among the image data converted by the image processor.

Preferably, the image forming unit includes: a memory for storing the fixing temperature values corresponding to the respective amounts of consumed toner in a table format; and a central processor for controlling the fixing temperature of the fixing unit by detecting the fixing temperature value corresponding the amount of consumed toner presumed by the image processing unit from the memory.

Preferably, as the presumed amount of consumed toner increases, the fixing temperature value increases.

According to another aspect of the present invention, the image forming device includes: an image processing unit for converting print information, which is coded and supplied from a document into image data, and for presuming an amount of consumed toner by operating on the size of the converted image data; and an image forming unit for storing transferring voltage values corresponding to respective amounts of consumed toner in the form of a table, and for controlling the transferring voltage level supplied to a transfer unit by detecting the transferring voltage value corresponding to the amount of consumed toner presumed by the image processing unit.

Preferably, the image processing unit includes: an image processor for converting the inputted print information into image data; and an operator for presuming the amount of consumed toner by operating on the size of the image data converted by the image processor.

At this time, the operator presumes the amount of consumed toner corresponding to a frame by operating on the size of the image data corresponding to the amount of one frame among the image data converted by the image processor.

Preferably, the image forming unit includes: a memory for storing the transferring voltage values corresponding to respective amounts of consumed toner in the form of a table; and a central processor for controlling the transferring voltage level supplied to the transfer unit by detecting the transferring voltage value corresponding to the amount of consumed toner presumed by the image processing unit from the memory.

Preferably, as the presumed amount of consumed toner increases, the transferring voltage level increases.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
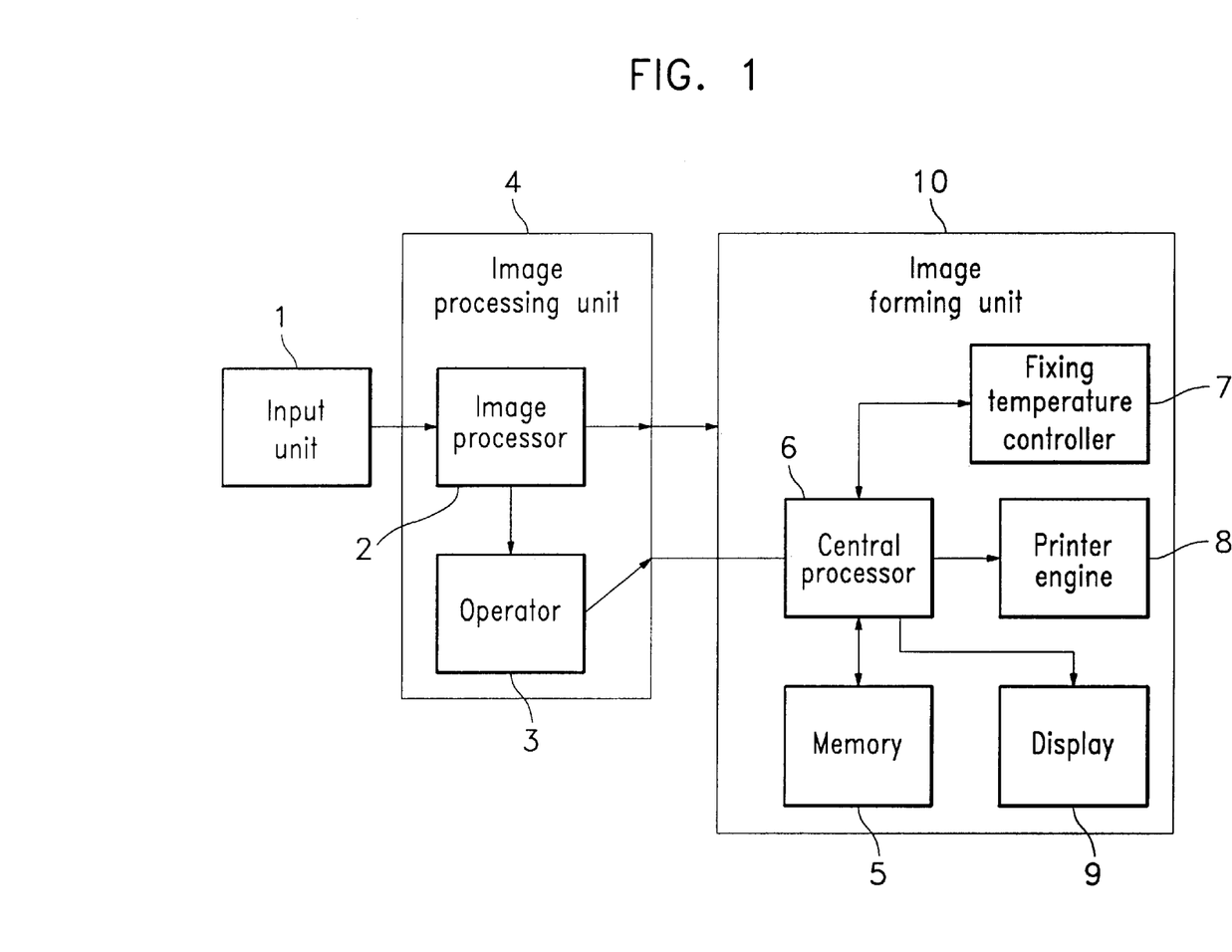
FIG. 1 is a block diagram roughly illustrating an embodiment of an image forming device according to the present invention.

FIG. 1 is a block diagram roughly illustrating one embodiment of an image forming device according to the present invention.

Referring to FIG. 1, the image forming device includes: an input unit 1 for inputting print information which is coded and supplied from a document; an image processing unit 4; and an image forming unit 10. The image processing unit 4 include: an image processor 2 for converting the print information inputted by the input unit 1 into bitmapped image data; and an operator 3 for operating on the size of the bitmapped image data which is converted by the image processor 2. Moreover, the image forming unit 10 includes: a memory 5 for storing fixing temperature values corresponding to respective amounts of consumed tone in the form of a table; a central processor 6 for presuming the amount of consuming toner from the size of the image data operated on by the image processing unit 4, for detecting the fixing temperature value corresponding to the amount of consumed toner presumed from the table stored in the memory 5, and for outputting a control signal for controlling the fixing temperature according to the detected information; a fixing temperature controller 7 for controlling the fixing temperature of a fixing unit (not shown) according to the control signal outputted from the central processor 6; a printer engine 8 for printing the bitmapped image data transmitted from the central processor 6 to provide image information; and a display 9 for displaying the operation state of a system by receiving control signals from the central processor 6.

Figure 2:
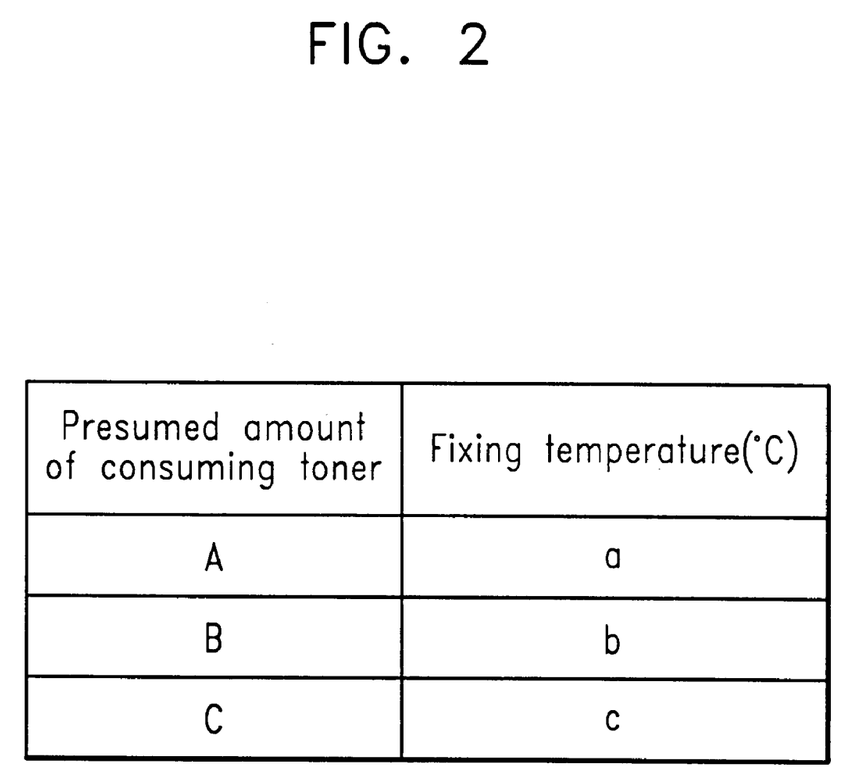
FIG. 2 is a table illustrating data stored in a memory shown in FIG. 1.

As shown in FIG. 2, in the memory 5, the fixing temperature value relating to the amount of consumed toner is stored in the form of a table. As the amount of consumed toner increases, the fixing temperature value increases.

The structure of the printer engine 8 is explained with reference to FIG. 3. The printer engine 8 includes a photosensitive drum 11 which is supported by a rotary body (not shown), and on which a photosensitive body having a thin layer is spread on a conductive plate. The photosensitive drum 11 is formed so as to the rotatably operated by a driving unit (not shown).

Moreover, around the photosensitive drum 11, there are: a charging unit 12 for charging the surface of the photosensitive drum 11 with a certain electric potential; an exposing unit 13, such as a laser diode, for forming an electrostatic latent image by radiating light toward the surface of the photosensitive drum 11; a developing unit 14 which is rotated in contact with the photosensitive drum 11 with an even pressure, and which repeatedly forms four color toner images (i.e., visible images) successively as an electrostatic latent image on the surface of the photosensitive drum 11; and a first cleaning unit 15 for removing residual toner from the surface of the photosensitive drum 11.

In addition, a transfer unit 16 includes a transfer drum 17 supported on the rotatable body. The transfer drum 17 is rotated in contact with the photosensitive drum 11 with a predetermined pressure. The transfer drum 17 used in the transfer unit 16, as shown in FIG. 4, includes a transfer cylinder 18 and a dielectric sheet 19 of PET or PVDF attached to the transfer cylinder 18.

On the surface of the transfer drum 17, a transferrable medium (i.e., a recordable medium) 20 is attached electrostatically or mechanically. Moreover, by applying a transferring voltage to the transfer cylinder 18 of the transfer drum 17, the toner image which is formed on the photosensitive body of the photosensitive drum 11 is transferred onto the recordable medium 20.

At the upper part of the transfer drum 17, a paper separating finger 21 is located. When the transferring operation is completed, a front portion of the separating finger 21 contacts the surface of the transfer drum 17, and separates the recordable medium 20 from the transfer drum 17. In addition, an anti-electrostatic unit 22 is formed at a position facing the transfer drum 17 to eliminate the static electricity from the transfer drum 17 as a final step in the transfer process.

At a position facing the transfer drum 17, a second cleaning unit 23 is located so as to clean the surface of the transfer drum 17 after transfer.

An adhering roller 24 is located at a point where the recordable medium 20 enters so as to contact the transfer drum 17, and it applies an adhering voltage to the transfer drum 17 so that the recordable medium 20 can be adhered to the transfer drum 17.

The recordable medium 20, separated from the transfer drum 17, passes between a heat roller 26 and a pressing roller 27 of the fixing unit 25, and thereby the toner image is fixed.

The developing unit 14 includes: a rotatable turret (not shown); four developers 14a to 14d which contain a yellow toner, a magenta toner, a cyan toner and a back toner, respectively; and a developer supporting body 28 having a cylindrical shape which receives the four developers and which is supported by a rotatable body (not shown).

The turret of the rotatable developing unit 14 is rotated in a certain direction (indicated by arrow A in FIG. 3), and the developers 14a to 14d move so as to face the surface of the photosensitive drum 11, thereby forming the electrostatic latent image on the surface of the photosensitive drum 11. During the time that developer supporting body 28 is rotated once, the aforesaid four colors are developed.

Moreover, at the lower part of the developing unit 14, a remaining toner amount detecting unit 29 is formed for detecting the toner amount remaining in each developer 14a to 14d of the developing unit 14.

The remaining toner amount detecting unit 29 includes a light emitting element (not shown) for transmitting light toward a measured developer by a predetermined angle; a light receiving element (not shown) for receiving the light reflected by the measured developer and for converting the light into an electrical signal corresponding to the quantity of the light; and a holder (not shown) for supporting the light emitting element and the light receiving element.

In the image forming device having the above-described structure, the recordable medium 20 which is fed and transported by a pickup roller of a feeding unit (not shown) is adhered to the surface of the dielectric sheet 19 of the transfer drum 17 by an adhering voltage of the adhering roller. The charging unit 12 charges the surface of the rotating photosensitive drum 11 with a predetermined electric potential, and the exposing unit (laser diode) 13 exposes the image of a first color (e.g., yellow color) based on the image information and in accordance with a predetermined timing, and then forms the electrostatic latent image corresponding to the yellow color on the photosensitive body of the photosensitive drum 11. At this time, since the developers 14a to 14d are successively carried by the turret of the rotatable developing unit 14 so as to face the surface of the photosensitive drum 11, the electrostatic latent image formed on the surface of the photosensitive drum 11 is developed by the toner, and thereby a visible image is formed.

The toner image, which becomes visible image by means of the developing units 14a to 14d, is rotated up to a position facing the transfer drum 17 of the transfer unit 16 (i.e., up to a developing position). The toner image, rotated up to the developing position facing the transfer drum 17, is transferred onto the recordable medium 20 which is adhered to the dielectric sheet 19 of the transfer drum 17 by the transferring voltage applied to the transfer cylinder 18.

The toner remaining on the surface of the photosensitive drum 11 is removed by the first cleaning unit 15, and the photosensitive drum 11 returns to a state capable of forming an image corresponding to the next color.

When the electrostatic latent image of a second color (e.g., magenta color) is formed on the photosensitive drum 11, the turret of the rotatable developing unit 14 is rotated, thereby carrying the next developer to a position facing the surface of the photosensitive drum 11.

The electrostatic latent image formed on the surface of the photosensitive drum 11 becomes a visible image by virtue of the toner of the second color (e.g. magenta color) formed at the developer by the aforesaid method. The toner image of the magenta color is transferred onto the surface of the recordable medium 20, onto which the yellow color as been previously transferred by the transferring voltage of the transfer cylinder 18.

After the toner images of four colors are transferred onto the surface of the recordable medium 20 using the same process, the separating finger 21 separates the recordable medium 20 from the transfer unit 16.

As described above, the toner images of all four colors are transferred and fixed onto the separate recordable medium 20 by heat having a predetermined temperature generated by the heat roller 26 of the fixing unit 25, and the recordable medium 20 is ejected to a paper eject orifice (not shown), thereby completing the printing operation.

Figure 5:
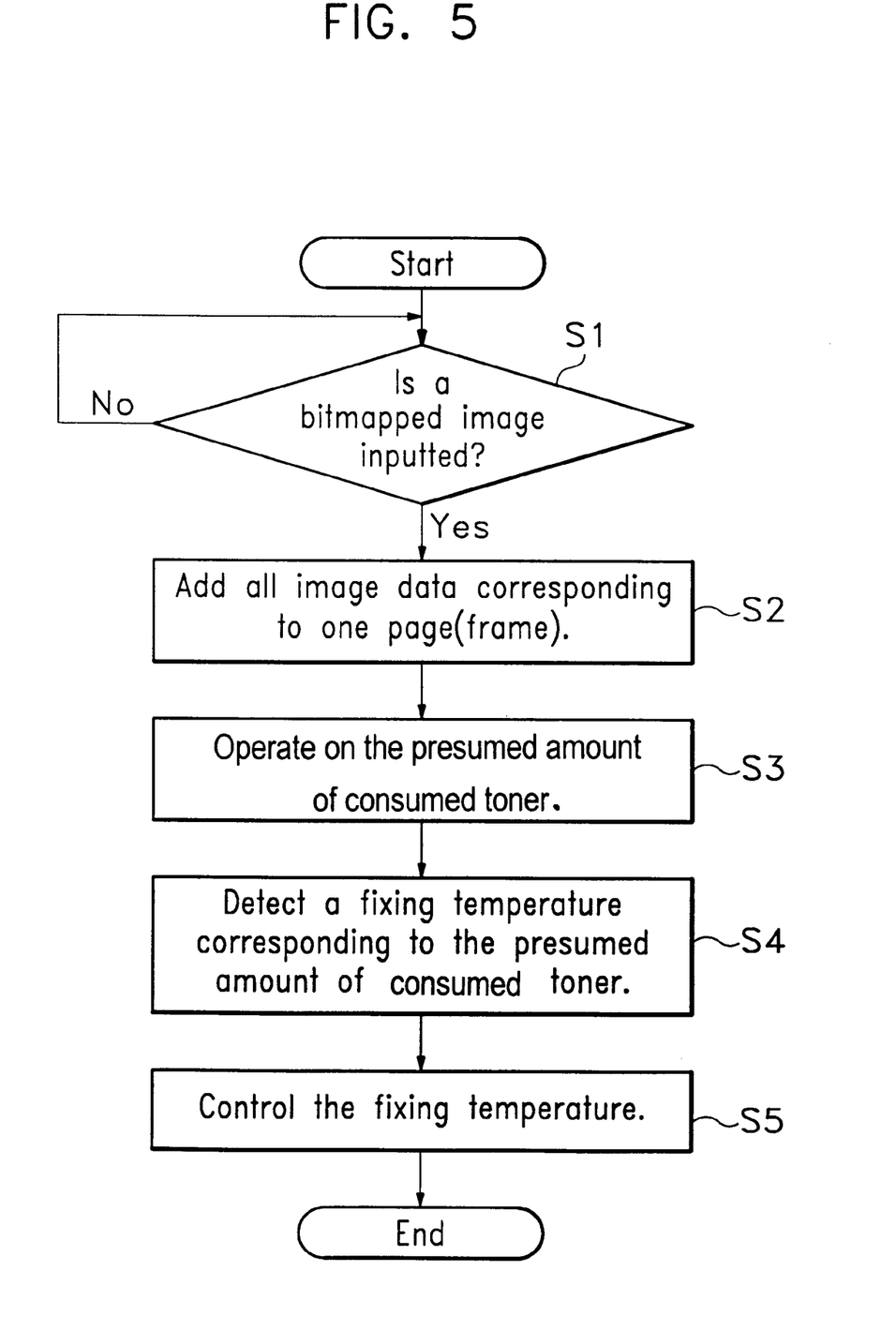
FIG. 5 is a flowchart illustrating an operation of each component part shown in FIG. 1.

The operation of one embodiment of the image forming device according to the present invention having the above-described structure is explained, with reference to FIG. 5.

First, when the coded print information is inputted to the image processing unit 4 through the input unit 1 (steps 1), the print information is converted into bitmapped image data by the image processor 2. Afterwards, the operator 3 adds all the image data corresponding to one page (i.e., a frame) (steps 2) and operates on the presumed amount of consumed toner (steps 3).

The operated amount of consumed toner is transmitted to the central processor 6, and the central processor 6 detects the transmitted amount of consumed toner and its corresponding fixing temperature from the memory 5 (steps 4). According to the detected fixing temperature, the heating degree of the fixing unit 25 is controlled (steps 5). As a result, poor fixing is prevented.

Figure 6:
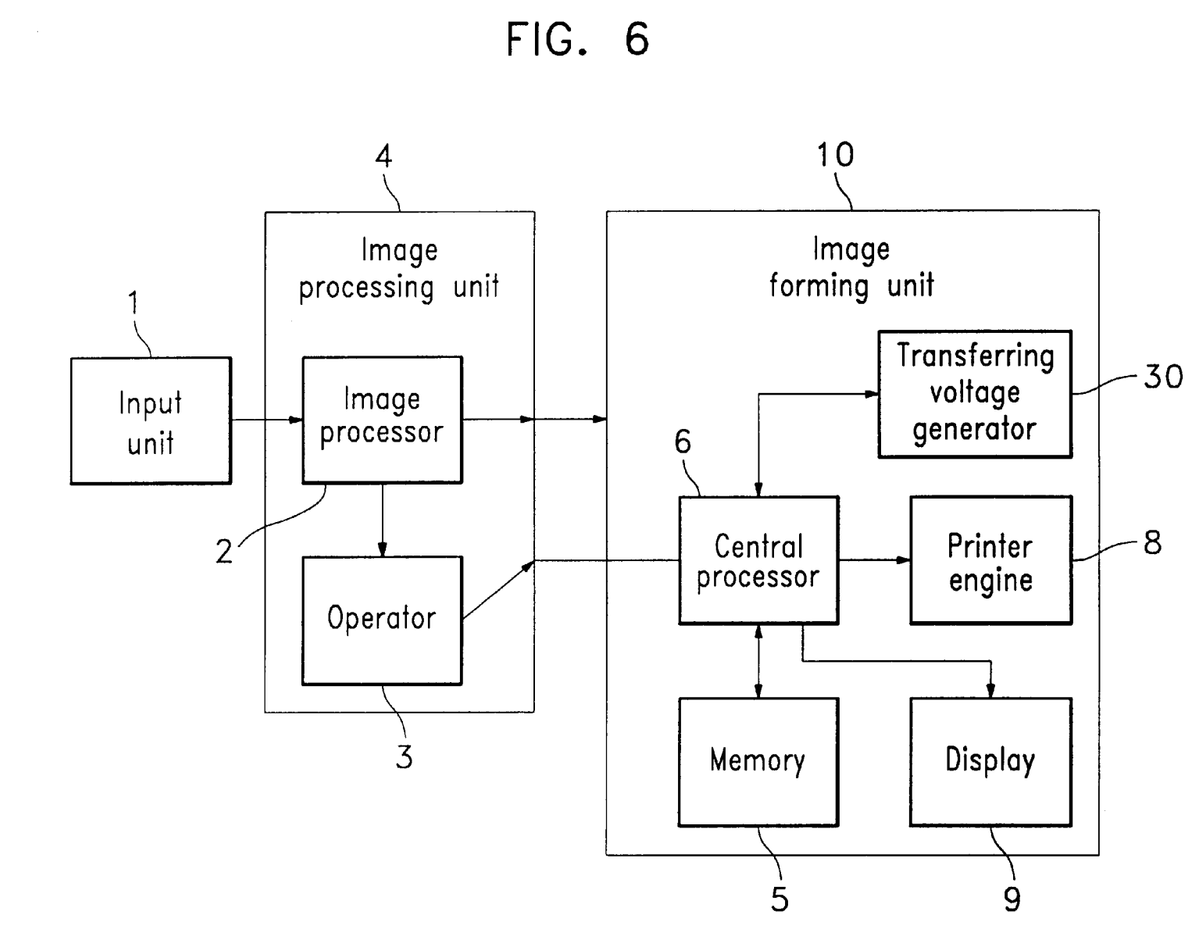
FIG. 6 is a block diagram roughly illustrating another embodiment of an image forming device according to the present invention.

FIG. 6 is a block diagram roughly illustrating another embodiment of the image forming device according to the present invention. In FIG. 6, identical reference numerals are used to identify identical component parts, and the relevant explanations are omitted. The essential component parts of the invention of FIG. 6 are explained.

Referring to FIG. 6, the structures of the input unit 1 and the image processing unit 4 are the same as in FIG. 1. In addition, the image forming unit 10 includes: memory 5 for storing the transferring voltage value according to the amount of consumed toner in the form of a table; central processor 6 for presuming the amount of consumed toner from the size of the image data operated on by the image processing unit 4, for detecting the transferring voltage level corresponding to the presumed amount of consumed toner from the table stored in the memory 5, and for outputting a control signal for controlling the transferring voltage level according to the detected information; a transferring voltage generator 30 which controls the transferring voltage level of the transfer unit in accordance with the control signal outputted by the central processor 6; a printer engine 8 for printing the bitmapped image data transmitted from the central processor 6 as image information; and a display 9 for displaying the operation state of the system by receiving the various control signals from the central processor 6.

Figure 3:
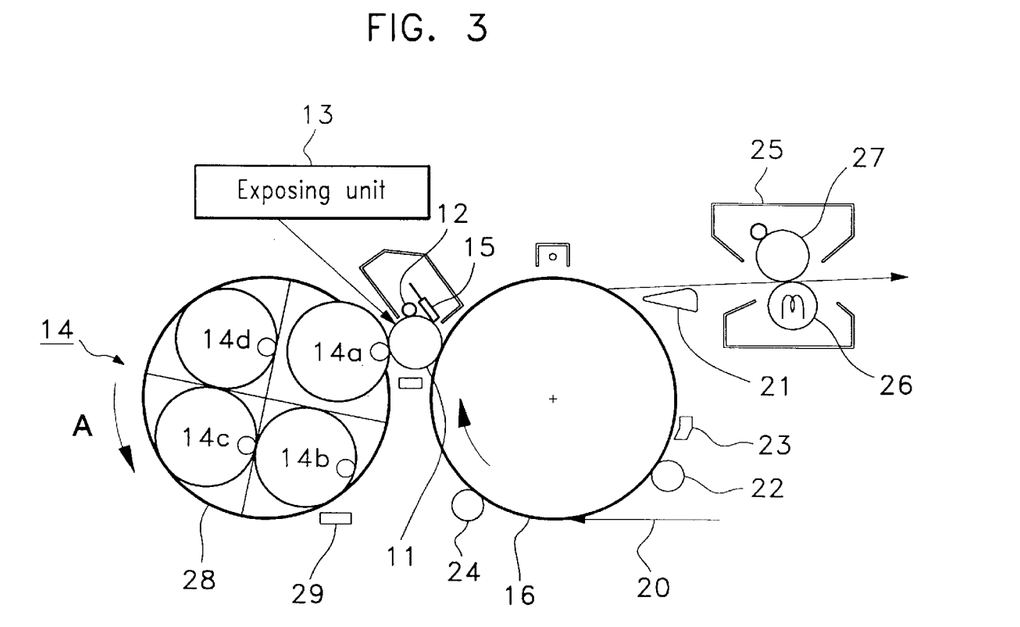
FIG. 3 is a structural view roughly illustrating a printer engine shown in FIG. 1.
Figure 4:
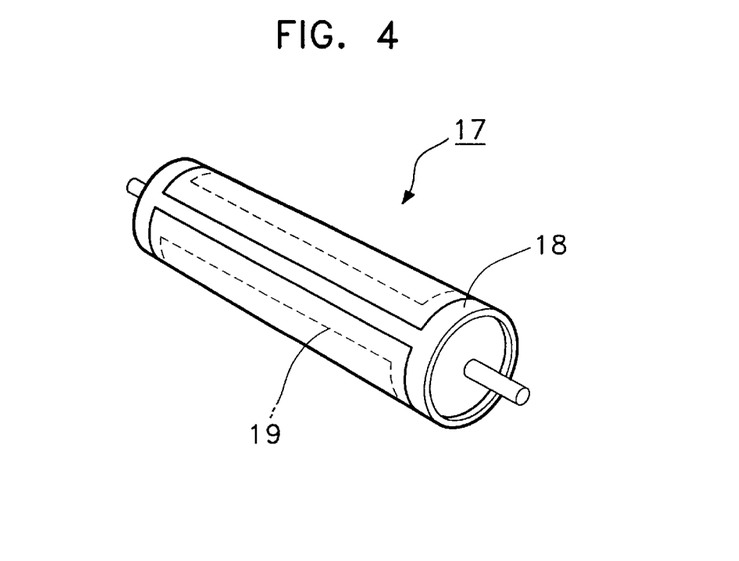
FIG. 4 is a detailed structural view of a transfer unit shown in FIG. 2.

The structure of the printer engine 8 is similar to that of the printer engine 8 previously illustrated in FIG. 3.

Figure 7:
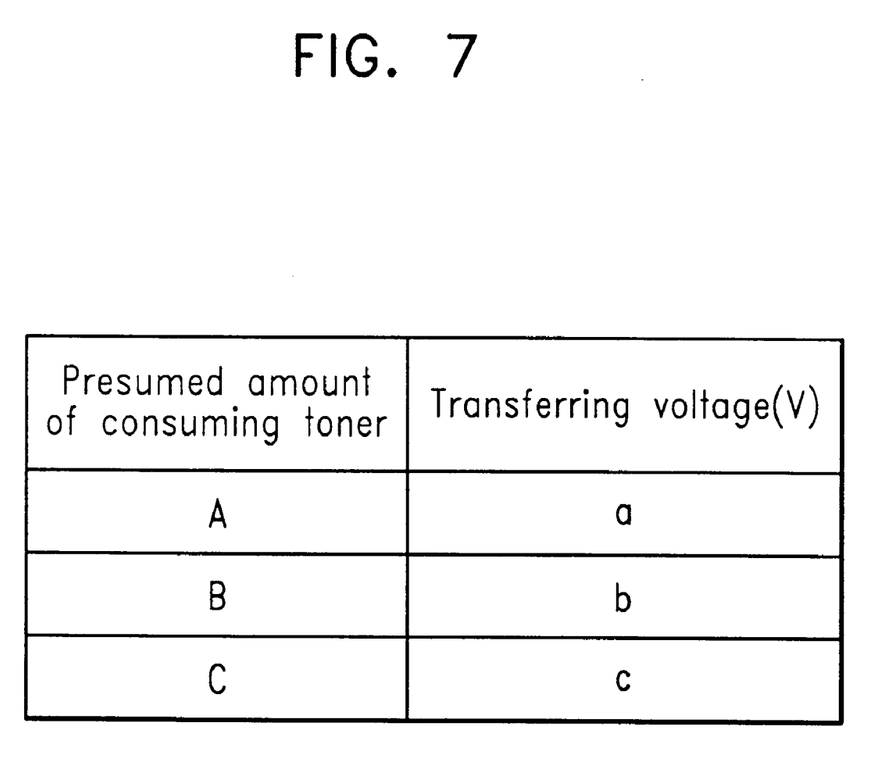
FIG. 7 is a table illustrating data stored in a memory shown in FIG. 6.

As shown in FIG. 7, in the memory 5, the transferring voltage value according to the amount of consumed toner is stored in the form of a table. As the amount of consumed toner increases, the transferring voltage level increases.

Figure 8:
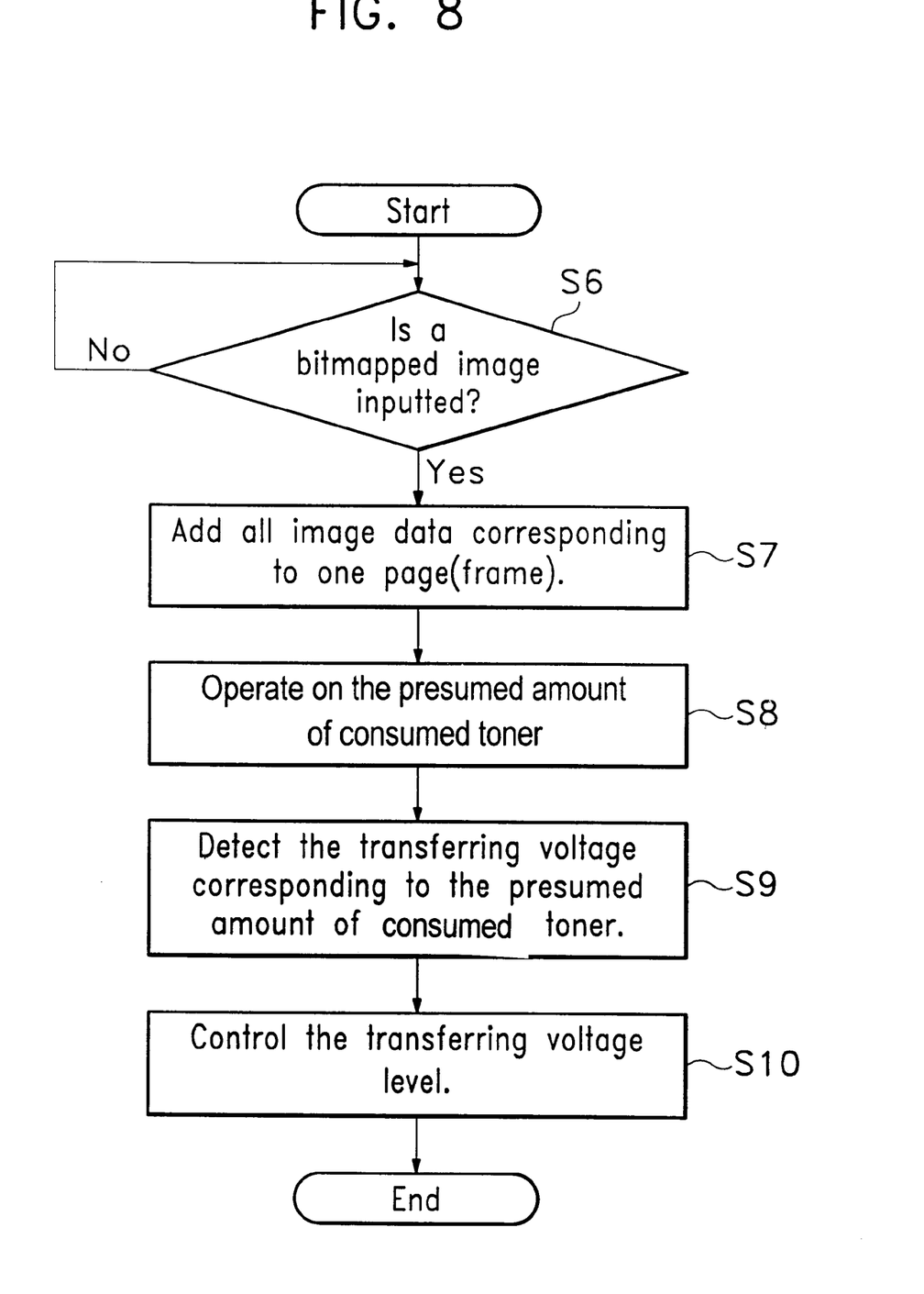
FIG. 8 is a flowchart illustrating an operation of each component part shown in FIG. 6.

The operation of the latter embodiment of the image forming device according to the present invention having the above-identified structure is explained with reference to FIG. 8.

When the coded print information is inputted to the image processing unit 4 through the input unit 1 (steps 6), the print information is converted into bitmapped image data by the image processor 2. The operator adds all the image data corresponding to one page (i.e., a frame) (steps 7) and presumes the amount of consumed toner (steps 8).

Subsequently, the operated amount of consumed toner is transmitted to the central processor 6, and the central processor 6 detects the transmitted amount of consumed toner and its corresponding transferring voltage value from the memory 5 (steps 9). According to the detected transferring voltage value, the transferring voltage level which is supplied to the transfer unit 16 is controlled (steps 10). As a result, poor transfer can be prevented.

As described above, the image forming device according to the present invention has the following benefits.

First, by presuming the amount of consumed toner which is transferred onto the recordable medium and variably controlling the fixing temperature of the fixing unit according to the presumed amount of consumed toner, poor fixing is prevented and an optimum print state can be maintained.

Second, by presuming the amount of consumed toner which is transferred onto the recordable medium and variably controlling the transferring voltage level according to the presumed amount of consumed toner, poor transfer is prevented and an optimum print state can be maintained.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An image forming device for forming a visible image corresponding to coded print information which is supplied from a document, and for forming an image by supplying a transferring voltage to a transfer unit and transferring said visible image onto a recordable medium, comprising:

image processing means for converting said coded print information into image data, and for presuming an amount of consumed toner by operating on a size of the converted image data; and image forming means for storing transferring voltage values corresponding to respective amounts of consumed toner in the form of a table, for determining from said table a transferring voltage value corresponding to the amount of consumed toner presumed by said image processing means, and for controlling a transferring voltage level supplied to said transfer unit in accordance therewith;

wherein, as said presumed amount of consumed toner increases, said transferring voltage level is set higher by said image forming means.

2. The image forming device of claim 1, wherein said image processing means comprises:

an image processor for converting said coded print information to provide said image data; and an operator for presuming the amount of consumed toner by operating on the size of the image data provided by said image processor.

3. The image forming device of claim 2, wherein said operator presumes the amount of consumed toner corresponding to a frame by operating on the size of the image data corresponding to said one frame among the image data provided by said image processor.

4. The image forming device of claim 1, wherein said image forming means comprises:

a memory for storing the transferring voltage values corresponding to the respective amounts of consumed toner in the form of a table; and a central processor for determining, from said table said transferring voltage value corresponding to the amount of consumed toner presumed by said image processing means, and for controlling the transferring voltage level supplied to said transfer unit in accordance therewith.

5. A method for forming an image to be printed on a recordable medium, comprising the steps of:

ascertaining whether bitmapped image data is received as an input;

when bitmapped image data is received as an input, adding all image data corresponding to a page;

operating on a presumed amount of consumed toner;

determining a transferring voltage corresponding to the presumed amount of consumed toner; and controlling the transferring voltage in accordance with a result of said determining step;

wherein said controlling step comprises controlling the transferring voltage in direct proportion to the presumed amount of toner.

6. The method of claim 5, wherein said determining step comprises determining a fixing temperature corresponding to the presumed amount of consumed toner; and wherein said controlling step comprises controlling the fixing temperature in accordance with the determined fixing temperature.

7. The method of claim 5, further comprising the step, prior to the determining step, of storing transferring voltage values corresponding to respective amounts of consumed toner in the form of a table; and wherein said determining step comprises using said table to determine said transferring voltage.

8. The method of claim 5, further comprising the step, prior to said step of ascertaining whether a bitmapped image is received as an input, of converting coded print information into bitmapped image data.

9. The method of claim 5, further comprising the step, prior to said step of determining said transferring voltage, of storing one of fixing temperature values and transferring voltage values corresponding to respective amounts of consumed toner in the form of a table; and wherein, in said table, said stored one of said fixing temperature values and said transferring voltage values increases as said presumed amount of consumed toner increases.

* * * * *